US 7,237,094 B2

(12) United States Patent
Curran et al.

(10) Patent No.: US 7,237,094 B2
(45) Date of Patent: Jun. 26, 2007

(54) INSTRUCTION GROUP FORMATION AND MECHANISM FOR SMT DISPATCH

(75) Inventors: Brian William Curran, Saugerties, NY (US); Brian R. Konigsburg, Austin, TX (US); Hung Qui Le, Austin, TX (US); David Arnold Luick, Rochester, MN (US); Dung Quoc Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 10/965,143

(22) Filed: Oct. 14, 2004

(65) Prior Publication Data

US 2006/0101241 A1 May 11, 2006

(51) Int. Cl.
G06F 9/38 (2006.01)
(52) U.S. Cl. .................. 712/213; 712/215; 712/216
(58) Field of Classification Search .............. 712/24, 712/213, 215, 216
See application file for complete search history.

(56) References Cited

U.S. PATENT DOCUMENTS 5,337,415 A * 8/1994 DeLano et al. ............. 712/213
5,828,895 A * 10/1998 Chan et al. ................. 712/23
5,958,042 A * 9/1999 Tremblay .................... 712/215

* cited by examiner

Primary Examiner—William M. Treat
(74) Attorney, Agent, or Firm—Diana Roberts Gerhardt; Jack V. Musgrove (57) ABSTRACT

A more efficient method of handling instructions in a computer processor, by associating resource fields with respective program instructions wherein the resource fields indicate which of the processor hardware resources are required to carry out the program instructions, calculating resource requirements for merging two or more program instructions based on their resource fields, and determining resource availability for simultaneously executing the merged program instructions based on the calculated resource requirements. Resource vectors indicative of the required resource may be encoded into the resource fields, and the resource fields decoded at a later stage to derive the resource vectors. The resource fields can be stored in the instruction cache associated with the respective program instructions. The processor may operate in a simultaneous multithreading mode with different program instructions being part of different hardware threads. When the resource availability equals or exceeds the resource requirements for a group of instructions, those instructions can be dispatched simultaneously to the hardware resources. A start bit may be inserted in one of the program instructions to define the instruction group. The hardware resources may in particular be execution units such as a fixed-point unit, a load/store unit, a floating-point unit, or a branch processing unit.

21 Claims, 5 Drawing Sheets

INSTRUCTION GROUP FORMATION AND MECHANISM FOR SMT DISPATCH

BACKGROUND OF THE INVENTION

1. Field of the Invention

The present invention generally relates to computer systems, and more particularly to an improved method of dispatching program instructions in a processor and to an improved processor design.

2. Description of the Related Art

Figure 1:
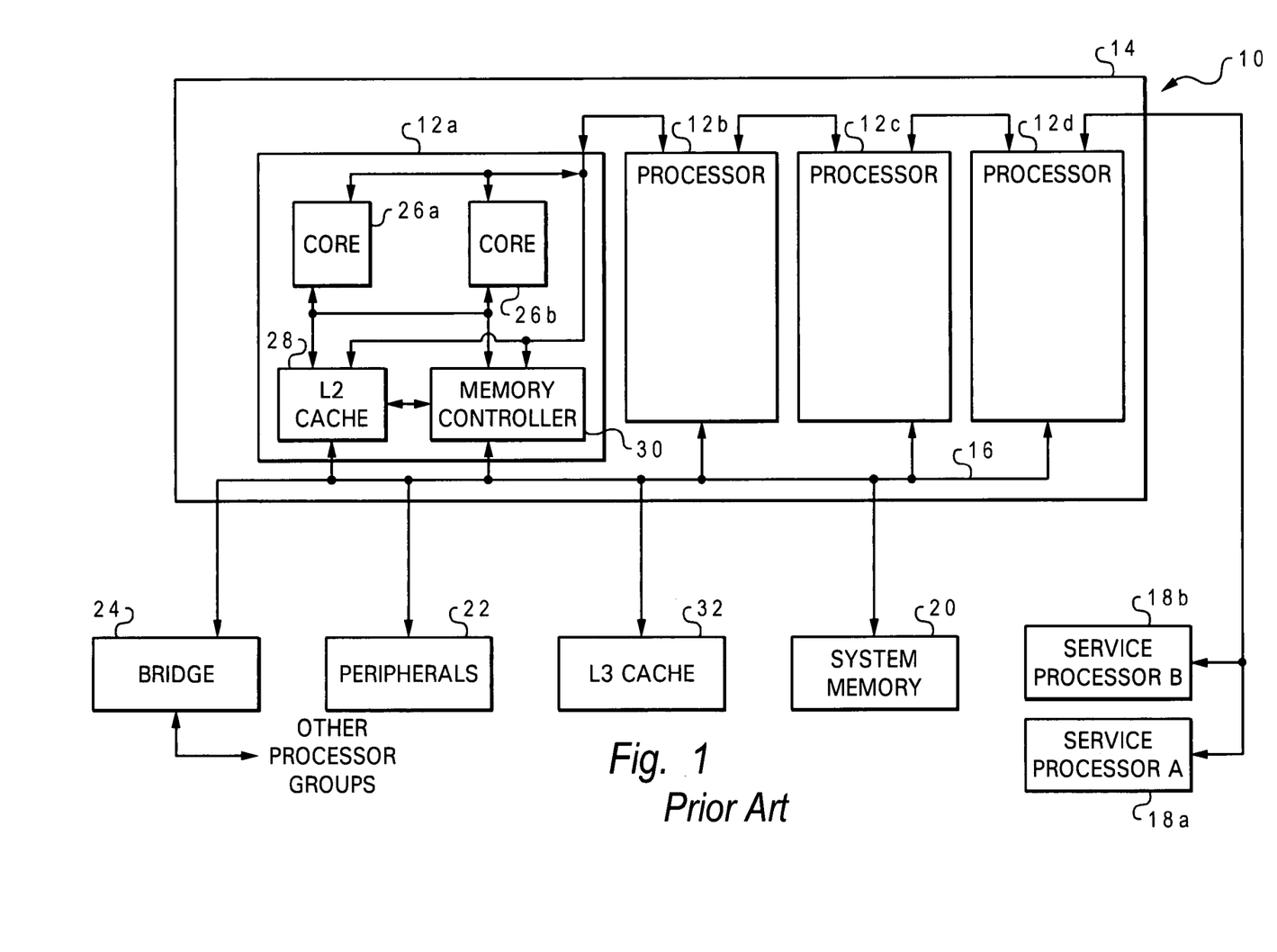
FIG. 1 is a block diagram depicting a conventional symmetric multi-processor (SMP) computer system, with internal details shown for one of the four generally identical processing units.

High-performance computer systems use multiple processors to carry out the various program instructions embodied in computer programs such as software applications and operating systems. A typical multi-processor system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or fabric bus 16. Fabric bus 16 is connected to a system memory 20, and various peripheral devices 22. Service processors 18a, 18b are connected to processing units 12 via a JTAG interface or other external service port. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory 20 (random access memory or RAM) stores program instructions and operand data used by the processing units, in a volatile (temporary) state. Peripherals 22 may be connected to fabric bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. PCI host bridge 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the Power5™ processor marketed by International Business Machines Corp., which comprises a single integrated circuit superscalar microprocessor having various execution units (fixed-point units, floating-point units, and load/store units), registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 26a, 26b may include an on-board (L1) cache (typically separate instruction cache and data caches) implemented using high speed memory devices. Caches are commonly used to temporarily store values that might be repeatedly accessed by a processor, in order to speed up processing by avoiding the longer step of loading the values from system memory 20. A processing unit can include another cache, i.e., a second level (L2) cache 28 which, along with a memory controller 30, supports both of the L1 caches that are respectively part of cores 26a and 26b. Additional cache levels may be provided, such as an L3 cache 32 which is accessible via fabric bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 512 kilobytes, and L3 cache 32 might have a storage capacity of 2 megabytes. To facilitate repair/replacement of defective processing unit components, each processing unit 12a, 12b, 12c, 12d may be constructed in the form of a replaceable circuit board or similar field replaceable unit (FRU), which can be easily swapped installed in or swapped out of system 10 in a modular fashion.

In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a predefined rules are satisfied. Within a pipeline superscalar processor, instructions are first fetched, decoded and then buffered. Instructions can be dispatched to execution units as resources and operands become available. Additionally, instructions can be fetched and dispatched speculatively based on predictions about branches taken. The result is a pool of instructions in varying stages of execution, none of which have completed by writing final results to the system memory hierarchy. As resources become available and branches are resolved, the instructions are retired in program order, thus preserving the appearance of a machine that executes the instructions in program order. Overall instruction throughput can be further improved by modifying the hardware within the processor, for example, by having multiple execution units in a single processor core.

Another technique known as hardware multithreading can be used to independently execute smaller sequences of instructions called threads or contexts. When a processor, for any of a number of reasons, stalls and cannot continue processing or executing one of these threads, the processor can switch to another thread. The term "multithreading" as used by those skilled in the art of computer processor architecture is not the same as the software use of the term in which one task is subdivided into multiple related threads. Software multithreading substantially involves the operating system which manipulates and saves data from registers to main memory and maintains the program order of related and dependent instructions before a thread switch can occur. Software multithreading does not require nor is it concerned with hardware multithreading and vice versa. Hardware multithreading manipulates hardware-architected registers, execution units and pipelined processors to maintain the state of one or more independently executing sets of instructions (threads) in the processor hardware. Hardware threads could be derived from, for example, different tasks in a multitasking system, different threads compiled from a software multithreading system, or from different I/O processors. In each example of hardware multithreading, more than one thread can be independently maintained in a processor's registers.

Simultaneous multithreading (SMT) is a processor design that combines hardware multithreading with superscalar processor technology to allow multiple threads to issue instructions each cycle. Unlike other hardware multi-threaded architectures in which only a single hardware context (i.e., thread) is active on any given cycle, SMT permits all thread contexts to simultaneously compete for and share processor resources. Also, unlike conventional superscalar processors, which suffer from a lack of per-thread instruction-level parallelism (ILP), simultaneous multithreading uses multiple threads to compensate for low single-thread ILP. The performance consequence is significantly higher instruction throughput and program speedups on a variety of workloads that include commercial databases, web servers and scientific applications in both multi-programmed and parallel environments.

There are still some performance disadvantages with SMT processing. In a typical SMT processor, two threads cannot be dispatched in the same cycle due to timing and complexity. In other words, one thread, and only that thread, can be dispatched in a given cycle, so another thread vying for resources must wait for its turn to be dispatched. If the dispatching thread cannot use up all resources (e.g., execution units), then one or more execution units may sit idle because the dispatching thread does not have enough instructions to feed all execution units. For example, if there were two fixed-point units (FXUs) and two load/store units (LSUs) in the processor, and if the dispatching thread only had two fixed-point instructions to be dispatched, then the two LSUs would sit idle for one cycle while the two FXUs are executing the instructions. This inefficiency can create bottlenecks in the processor, and lower overall processing throughput of the system.

It would, therefore, be desirable to devise an improved method of handling instructions in an SMT processor so as to increase the effective dispatching bandwidth. It would be further advantageous if the method could more efficiently utilize existing processor hardware without adding undue overhead.

SUMMARY OF THE INVENTION

It is therefore one object of the present invention to provide an improved method of dispatching program instructions in a processor of a computer system.

It is another object of the present invention to provide such a method that can be advantageously implemented in a simultaneous multithreading (SMT) processor design to increase dispatching bandwidth.

It is yet another object of the present invention to provide an improved construction for an SMT processor.

The foregoing objects are achieved in a method of handling instructions in a computer processor having multiple hardware resources, generally comprising the steps of receiving at least first and second program instructions, associating first and second resource fields respectively with the first and second program instructions wherein the resource fields indicate which of the hardware resources are required to carry out the respective program instructions, calculating resource requirements for merging the first and second program instructions based on the first and second resource fields, and determining resource availability for simultaneously executing the first and second program instructions based on the calculated resource requirements. First and second resource vectors may be encoded respectively into the first and second resource fields, and the calculating includes decoding the resource fields to derive the first and second resource vectors. The resource fields can be stored in the instruction cache associated with the respective program instructions. The processor may operate in a simultaneous multithreading mode with the first program instruction being part of a first thread and the second program instruction being part of a second thread. When the resource availability equals or exceeds the resource requirements for a group of instructions, those instructions can be dispatched simultaneously to the hardware resources. A start bit may be inserted in one of the program instructions to define the instruction group. The hardware resources may in particular be execution units, including at least a fixed-point unit, a load/store unit, a floating-point unit, and a branch processing unit. The invention accordingly allows multiple instructions to be simultaneously executed, thereby making more efficient use of the hardware resources and increasing overall processor throughput.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
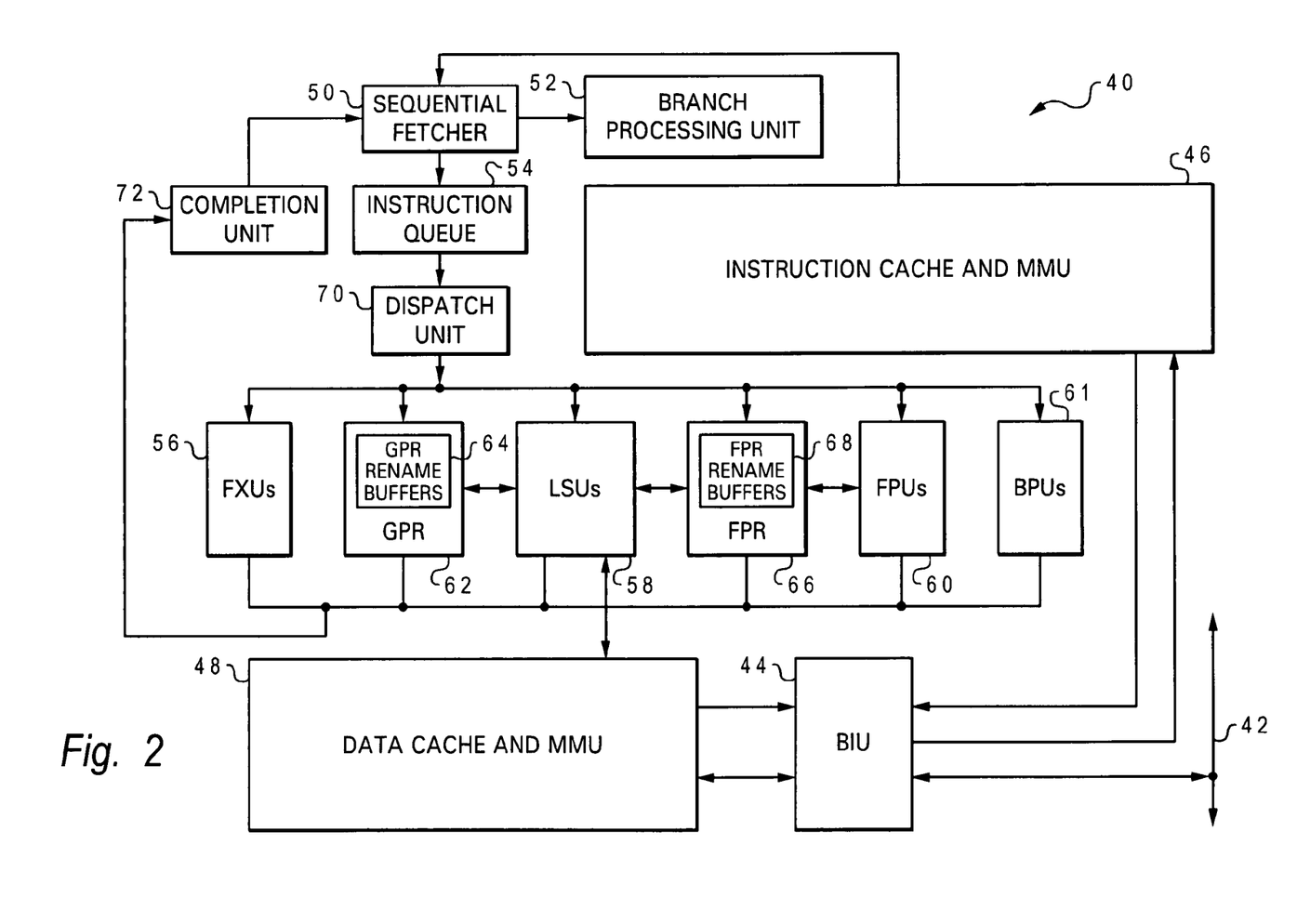
FIG. 2 is a block diagram of one embodiment of a computer processor constructed in accordance with the present invention, which has multiple execution units including fixed-point units, floating-point units, load/store units, and branch processing units.

With reference now to the figures, and in particular with reference to FIG. 2, there is depicted one embodiment 40 of a computer processor constructed in accordance with the present invention. Processor 40 is generally comprised of a single integrated circuit superscalar microprocessor, and includes various execution units, registers, buffers, memories, and other functional units (explained further below), which are all formed by integrated circuitry. Processor 40 may operate according to reduced instruction set computing (RISC) techniques. Processor 40 is coupled to a system or fabric bus 42 via a bus interface unit (BIU) 44 within processor 40. BIU 44 controls the transfer of information between processor 40 and other devices coupled to system bus 42, such as a main memory (not illustrated), by participating in bus arbitration. Processor 40, system bus 42, and the other devices coupled to system bus 42 together form a host data processing system. Those skilled in the art will appreciate that the present invention is not limited to the specific construction shown in FIG. 2, as some components may be omitted, other components may be added, or different interconnections provided while still affording the novel functionality disclosed herein.

BIU 44 is connected to an instruction cache and memory management unit (MMU) 46, and to a data cache and MMU 48 within processor 40. High-speed caches, such as those within instruction cache and MMU 46 and data cache and MMU 48, enable processor 40 to achieve relatively fast access time to a subset of data or instructions previously transferred from main memory to the caches, thus improving the speed of operation of the host data processing system. Instruction cache and MMU 46 is further coupled to a sequential fetcher 50, which fetches instructions for execution from instruction cache and MMU 46 during each cycle. Sequential fetcher 50 transmits branch instructions fetched from instruction cache and MMU 46 to a branch processing unit (BPU) 52 for calculating the next instruction fetch address, but temporarily stores sequential instructions within an instruction queue 54 for execution by other execution circuitry within processor 40.

In addition to BPU 52, the execution circuitry of processor 40 has multiple execution units for executing sequential instructions, including fixed-point units (FXUs) 56, load-store units (LSUs) 58, floating-point units (FPUs) 60, and other branch processing units (BPUs) 61. These execution units 56, 58, 60, and 61 execute one or more instructions of a particular type of sequential instructions during each processor cycle. For example, FXU 56 performs fixed-point mathematical and logical operations such as addition, subtraction, ANDing, ORing, and XORing, utilizing source operands received from specified general purpose registers (GPRs) 62 or GPR rename buffers 64. Following the execution of a fixed-point instruction, FXUs 56 output the data results of the instruction to GPR rename buffers 64, which provide temporary storage for the operand data until the instruction is completed by transferring the result data from GPR rename buffers 64 to one or more of GPRs 62. FPUs 60 perform single and double-precision floating-point arithmetic and logical operations, such as floating-point multiplication and division, on source operands received from floating-point registers (FPRs) 66 or FPR rename buffers 68. FPU 60 outputs data resulting from the execution of floating-point instructions to selected FPR rename buffers 68, which temporarily store the result data until the instructions are completed by transferring the result data from FPR rename buffers 68 to selected FPRs 66. LSUs 58 execute floating-point and fixed-point instructions which either load data from memory (i.e., either the data cache within data cache and MMU 48 or main memory) into selected GPRs 62 or FPRs 66, or which store data from a selected one of GPRs 62, GPR rename buffers 64, FPRs 66, or FPR rename buffers 68 to system memory. BPUs 61 perform condition code manipulation instructions and branch instructions.

Processor 40 may employ both pipelining and out-of-order execution of instructions to further improve the performance of its superscalar architecture. Accordingly, instructions can be executed by FXUs 56, LSUs 58, FPUs 60, and BPUs 61 in any order as long as data dependencies are observed. In addition, instructions may be processed by each of the FXUs 56, LSUs 58, FPUs 60, and BPUs 61 at a sequence of pipeline stages, in particular, five distinct pipeline stages: fetch, decode/dispatch, execute, finish, and completion.

During the fetch stage, sequential fetcher 50 retrieves one or more instructions associated with one or more memory addresses from instruction cache and MMU 46. Sequential instructions fetched from instruction cache and MMU 46 are stored by sequential fetcher 50 within instruction queue 54. In contrast, sequential fetcher 50 removes (folds out) branch instructions from the instruction stream and forwards them to BPU 52 for execution. BPU 52 includes a branch prediction mechanism, which may comprise a dynamic prediction mechanism such as a branch history table, that enables BPU 52 to speculatively execute unresolved conditional branch instructions by predicting whether or not the branch will be taken.

During the decode/dispatch stage, dispatch unit 70 decodes and dispatches one or more instructions from instruction queue 54 to execution units 56, 58, 60, and 61, as explained further below. In addition, dispatch unit 70 allocates a rename buffer within GPR rename buffers 64 or FPR rename buffers 68 for each dispatched instruction' result data. Upon dispatch, instructions are also stored within the multiple-slot completion buffer of completion unit 72 to await completion. Processor 40 tracks the program order of the dispatched instructions during out-of-order execution utilizing unique instruction identifiers.

During the execute stage, execution units 56, 58, 60, and 61, execute instructions received from dispatch unit 70 opportunistically as operands and execution resources for the indicated operations become available. Each of execution units 56, 58, 60, and 61, are preferably equipped with a reservation station that stores instructions dispatched to that execution unit until operands or execution resources become available. After execution of an instruction has terminated, execution units 56, 58, 60, and 61, store data results, if any, within either GPR rename buffers 64 or FPR rename buffers 68, depending upon the instruction type. Then, execution units 56, 58, 60, and 61, notify completion unit 72 which instructions have finished execution. Finally, instructions are completed in program order out of the completion buffer of completion unit 72. Instructions executed by FXUs 56 and FPUs 60 are completed by transferring data results of the instructions from GPR rename buffers 64 and FPR rename buffers 68 to GPRs 62 and FPRs 66, respectively. Load and store instructions executed by LSUs 58 are completed by transferring the finished instructions to a completed store queue or a completed load queue from which the indicated load/store operations will be performed.

In the illustrative embodiment, processor 40 uses simultaneous multithreading (SMT) to enhance processor throughput, by allowing multiple threads to issue different instructions each cycle. Hardware multithreading may be implemented in processor 40 in a variety of forms, such as coarse-grained multithreading (executing one thread until the executing thread experiences a long latency event, e.g., retrieving data and/or instructions from memory, a processor interrupt, etc.) or fine-grained multithreading (interleaving or switching threads on a cycle-by-cycle basis). In general, processor 40 uses simultaneous hardware multithreading to maintain N threads, or N states, in parallel in the processor and simultaneously execute N threads in parallel. Processor registers may be replicated for each of the N threads' results in some of the following registers (replicated N times): general purpose registers, floating point registers, condition registers, floating point status and control registers, count registers, link registers, exception registers, save/restore registers, special purpose registers, etc. Special buffers such as a segment lookaside buffer may be replicated but if not, each entry can be tagged with the thread number and flushed on every thread switch. Also, some branch prediction mechanisms, e.g., the correlation register and the return stack, may also be replicated. Not all of the processor's features need be replicated for each thread and there may be some shared and some replicated registers and/or there may be some separate parallel stages in the pipeline or there may be other shared stages of the pipeline. There is no need to replicate certain higher-level functions of the processor such as the caches, instruction buffer, store queue, instruction dispatcher, functional or execution units, pipelines, translation lookaside buffer (TLB), or branch history table.

The present invention is advantageously implemented in an SMT processor design to increase dispatching bandwidth, by enhancing the manner in which instructions are dispatched to the various execution units. An encoded resource field is sent with each instruction to dispatch unit 70, to indicate what resources each particular instruction will use at dispatch time. The resource field for a given instruction is encoded and written within instruction cache and MMU 46 ("ICache"), and stored along with the instruction itself in the ICache. A resource can be any functional unit or architected facility, and in particular refers to execution units such as FXUs 56, LSUs 58, FPUs 60, and BPUs 61.

Figure 3:
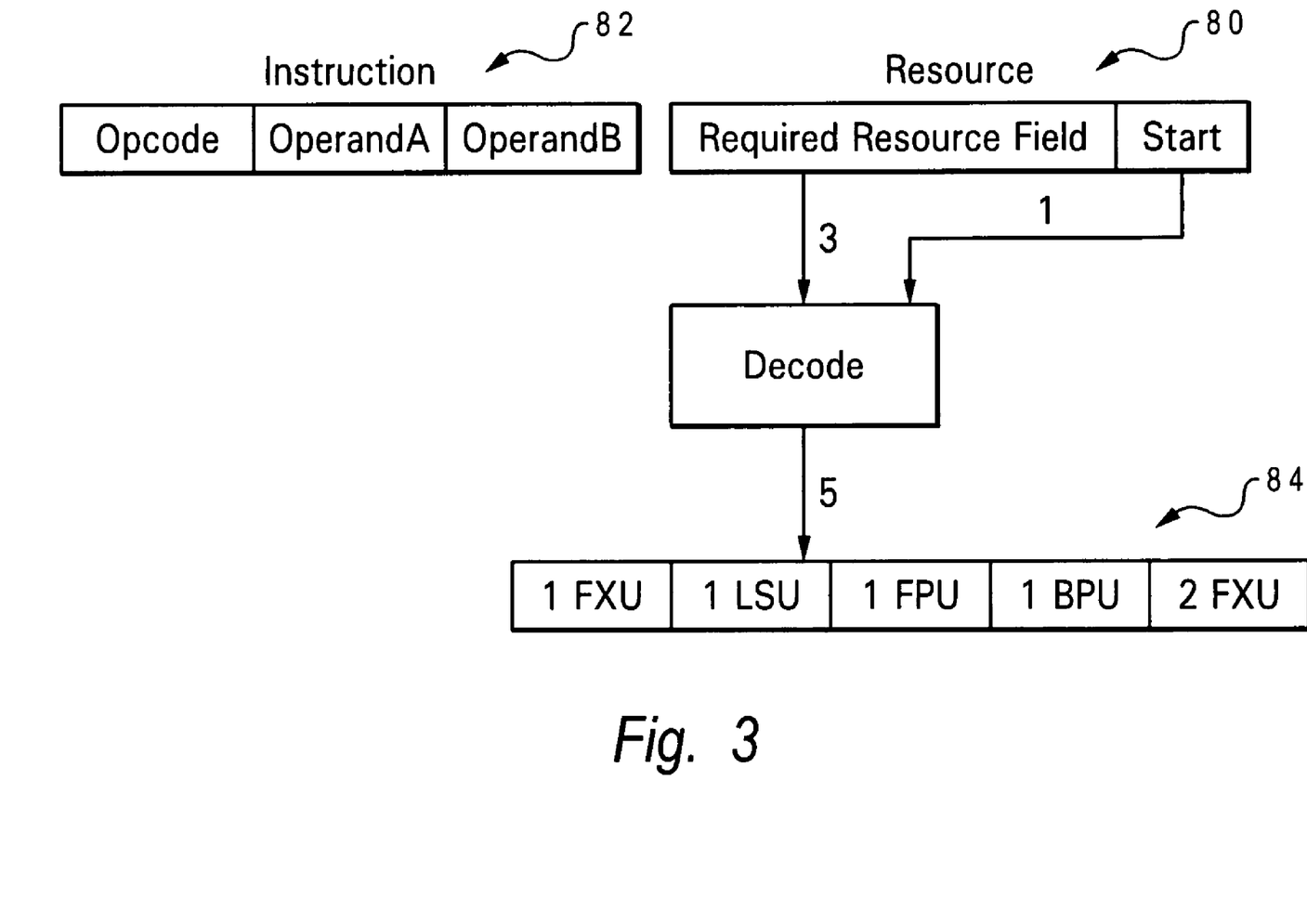
FIG. 3 is a pictorial representation of a resource field used by the processor of FIG. 2 for dispatching program instructions in accordance with one implementation of the present invention.

One implementation of the resource field 80 for an instruction 82 is shown in FIG. 3. Resource field 80 includes a "start" bit and the required resource bits (three bits in this example). The start bit is used to group instructions together for simultaneous dispatching of multiple instructions. In other words, multiple instructions can be dispatched as a group. As explained further below, the group can be formed at predecode stage, prior to being written into the ICache. When the resource field is decoded, the decoded bits indicate the resource requirement of this instruction (i.e., the resource vector 82). In this example, the resource bits decode into one of five possible values, to indicate one of the following five resource requirements: "1 FXU"; "1 LSU"; "1 FPU"; "1 BPU"; or "2 FXU". The "1 FXU" vector indicates that the instruction needs to use one (one only one) FXU execution unit; if this value is zero, then no fixed-point units are necessary for the operation. The "1 LSU" vector indicates that the instruction needs to use one LSU execution unit; if this value is zero, then no load/store units are necessary for the operation. The "1 FPU" vector indicates that the instruction needs to use one FPU execution unit; if this value is zero, then no floating-point units are necessary for the operation. The "1 BPU" vector indicates that the instruction needs to use one BPU execution unit; if this value is zero, then no branch processing units are necessary for the operation. The "2 FXU" vector indicates that the instruction needs to use two FXU execution units; if this value is zero, then the operation will require either no or one fixed-point unit as prescribed by the "1 FXU" bit. This example thus refers to a processor which has two FXUs 56 ("FXU0" and "FXU1"). Depending on the implementation and type of instruction, multiple bits of the decoded resource field can be active to indicate other variations of resources required by an instruction.

An instruction group is to be formed such that all instructions in the same group of the same thread can be dispatched together. This directive means that (i) there cannot be dependency between instructions within the group, and (ii) the resource requirement for the group cannot exceed the available resources. For example, if the microprocessor has two FXUs then the instruction group cannot require more than two FXUs for completion. For a given thread, a start bit will be inserted on the instruction after the second FXU instruction to terminate the group, in order to ensure that a maximum of two FXU instructions are in a group. In another example, if there are five execution units (of any type) in the microprocessor, then the start bit will be inserted on the sixth instruction if the previous (older) five instructions can all be dispatched to the five execution units during the same cycle. Thus, if an instruction is the first instruction in a group, then the start bit is ignored and the instruction and required resource field are considered valid (presuming the instruction itself is valid). If an instruction is not the first instruction in the group, then the start bit is evaluated and, if the start bit is active (1), then this instruction and any younger instructions are considered invalid and the required resource field for those instructions are also invalid. The start bit is also inserted on any instruction that has a dependency on an older instruction to ensure that a dependent instruction is in a different group than the instruction that is producing its result.

Figure 4:
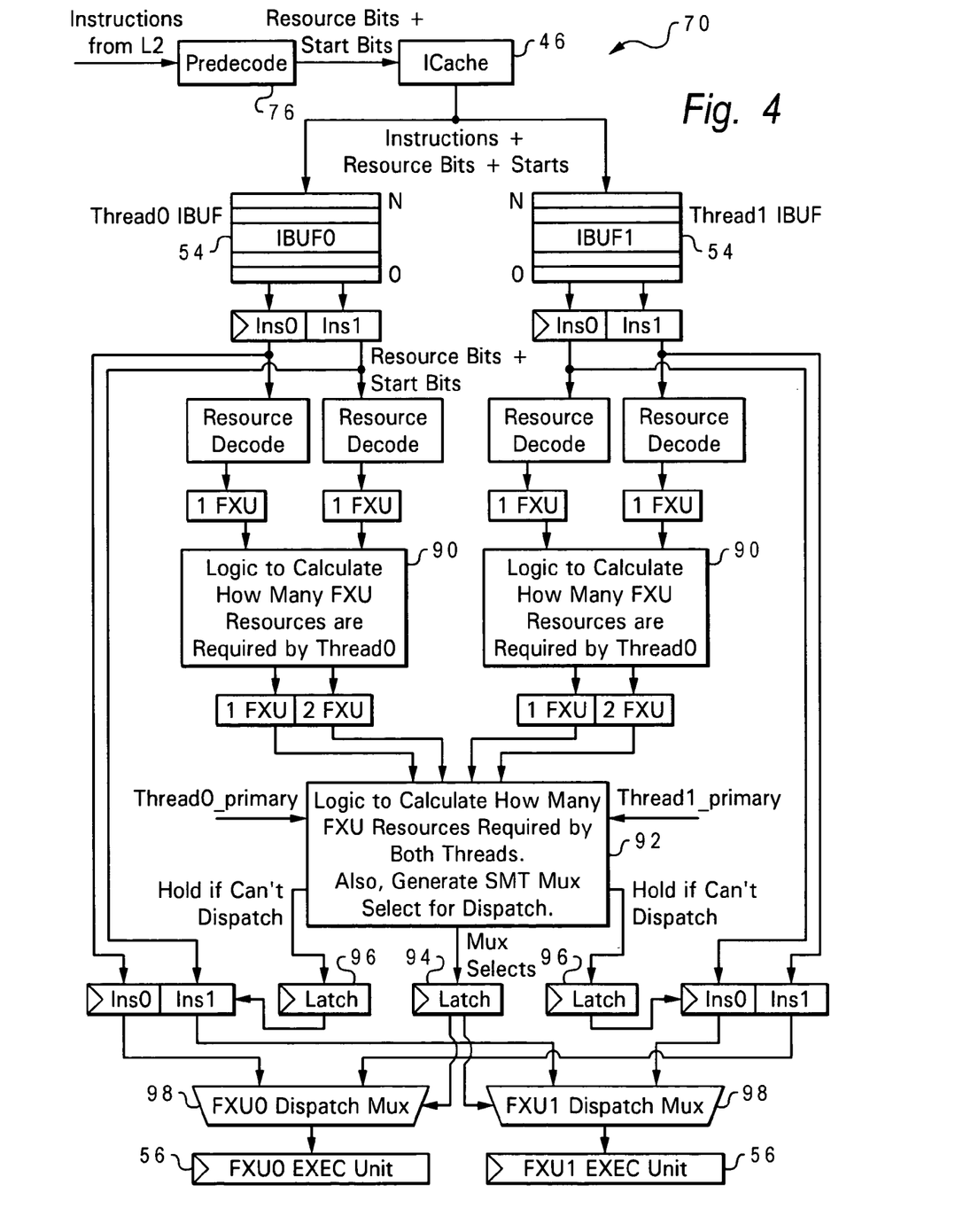
FIG. 4 is a block diagram illustrating the dataflow and resource field calculation to support dispatching of multiple threads in a single processor cycle for a simultaneous multithreading (SMT) mode in accordance with one embodiment of the present invention.

FIG. 4 shows the dataflow and resource field calculation to support dispatching of two threads to FXUs during the same cycle for an SMT mode. Instructions from the L2 cache are examined by a predecode circuit 76 which generates the resource and start bits for each instruction, and this information is written with the instructions into ICache 46. At fetch time, the instructions and the resource field for those instructions are sent to an instruction buffer (IBUF) in instruction queue 54 to store the instructions for dispatch. There is one IBUF per thread in SMT mode. In this example, there are two threads to be executed in SMT mode, "thread0" and "thread1". At any given time, a thread will have higher dispatching priority (this thread is called the primary thread), and the other thread will have lower dispatching priority (this thread is called the secondary thread). When the instructions are read out of the IBUF for dispatching by dispatch unit 70, the resource fields for those instructions are also read out. The two IBUFs are read at the same time. The resource fields for each thread are decoded by logic circuits 90 to determine what resources are needed by each thread. The start bits are also read. The start bit of the first instruction in the group is ignored. If the start bit of a particular instruction X is active and the instruction X is not first in the group, then the resource fields of this instruction and any instructions younger than X will be invalid as explained above (i.e., the resource fields of instructions older than instruction X in this group are still valid). The decoded resource fields of each thread (the resource vectors) are then merged together by logic circuit 92 to calculate the total resources that are required by both threads. Logic circuit 92 generates the multiplexer select signals for appropriate dispatch of the instructions, which are held in latches 94. If there are insufficient resources available to simultaneously dispatch both of the threads, then a "hold" signal is generated for one of the threads and stored in separate latches 96. The instructions are then sent to the FXU dispatch multiplexers 98 which are controlled by the select signals generated by logic 92. Multiplexers 98 pass the selected instructions on to the respective FXUs 56.

Depending on the total resource requirement by both threads, several scenarios can be identified. If the total required resources by both threads is equal or less than the number of available resources, then all instructions from both threads can be dispatched at the same time. For example, if the microprocessor has two FXU execution units available, thread0 needs only one FXU, and thread1 needs only one FXU, then all instructions from both threads can be dispatched in the same cycle. If the total required resources by both threads is more than the number of available resources, then the primary thread will take all resources that it needs, and the secondary thread will take any remaining resources. For example, if the microprocessor has again has two FXU execution units available, thread0 needs one FXU, thread1 needs two FXUs, and thread0 is the primary thread, then both threads can still be dispatched in the same cycle, with thread0 dispatching one FXU instruction because it is the primary thread, while thread1 can only dispatch one of its two FXU instructions. The second FXU instruction from the secondary thread will wait until the next cycle to be eligible for resource calculation and dispatch. In another example, again with the microprocessor having two FXU execution units available, if thread0 needs two FXUs, thread1 needs one FXU, and thread0 is the primary thread, then only thread0 will be dispatched. Thread0 will be able to dispatch both of its FXU instructions because it is the primary thread, while thread1 cannot dispatch any FXU instruction. The FXU instruction from the secondary thread will wait until the next cycle to be eligible for resource calculation and dispatch.

The noted architecture for the embodiments of FIGS. 3 and 4 is exemplary only and not to be construed in a limiting sense, as there could be more than just two execution units of same type, and the multiple execution units could be units other than the fixed-point units. For example, there could be four FXUs, four LSUs, four FPUs, and four BPUs in a single processor core. Conversely, the invention can still be utilized in systems that have no redundant execution units, i.e., just one FXU, one LSU, one FPU, and one BPU, since the invention allows multiple instructions to be simultaneously dispatched to any of those units.

Figure 5:
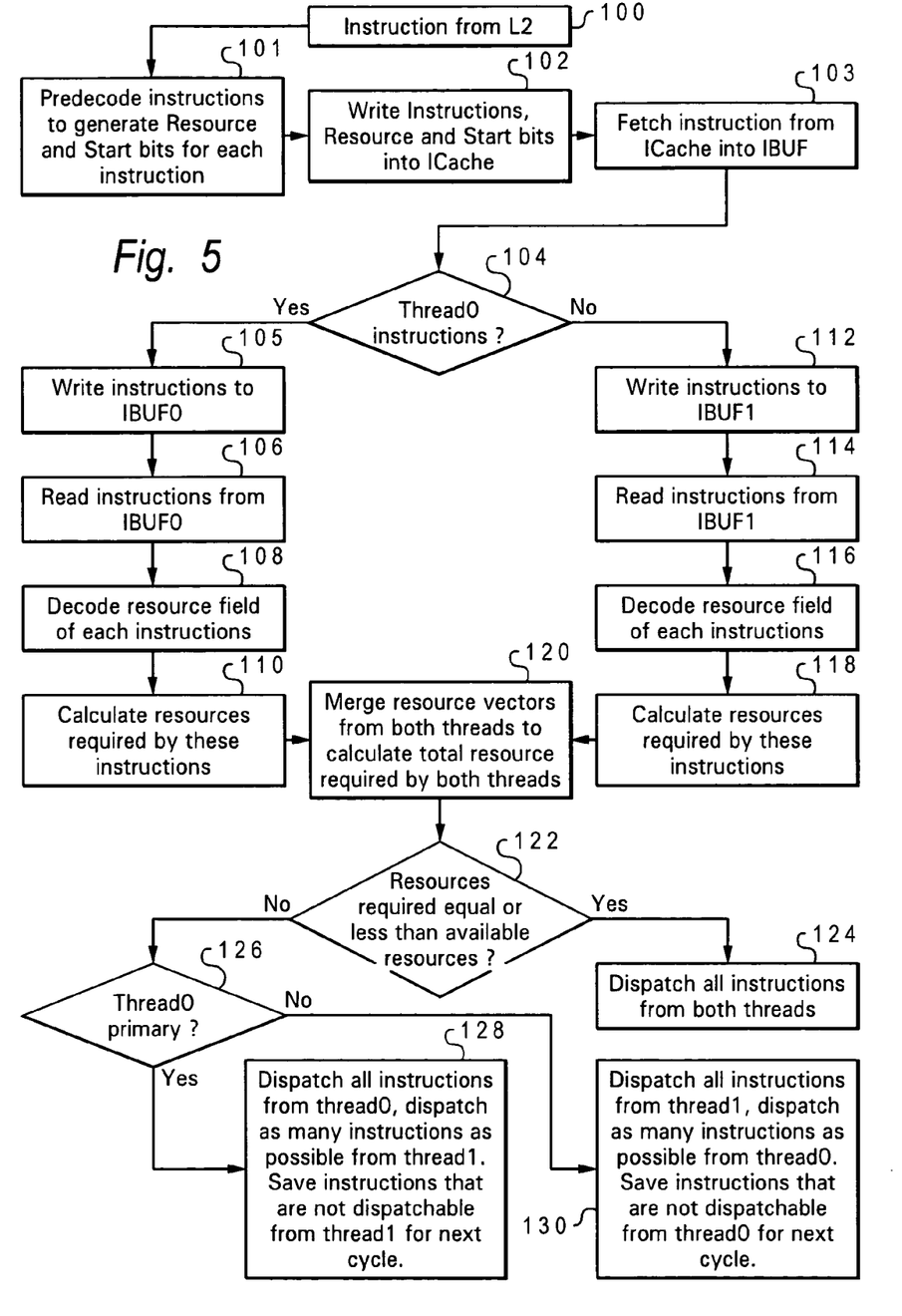
FIG. 5 is a chart depicting the logical flow for dispatching program instructions in accordance with one implementation of the present invention.

FIG. 5 is a chart illustrating the logical process flow in dispatching two threads in SMT mode. The process begins with an instruction being retrieved from the L2 cache (100). The instruction is predecoded to generate its resource and start bits (101), and this information is written along with the instruction into the instruction cache (102). The instruction is then fetched to the IBUF (103). A check is performed to determine which thread is involved (thread0 or thread1) (104). If the instructions are from thread0 then they are written to IBUF0 (104), and dispatch unit 70 will read the instructions from IBUF0 (106). The resource field for each instruction is decoded (108), and the resources required by the instructions are calculated (110). Returning to step 102, if the instructions are not from thread0 (i.e., they are part of thread1) then they are written to IBUF1 (112), and dispatch unit 70 will read those instructions from IBUF1 (114). The resource field for each instruction is similarly decoded (116), and the resources required by the instructions are calculated (118). The decoded resource vectors from both threads are merged to calculate the total resource requirements by both threads (120). The dispatch logic then determines whether the resources required for both threads are equal to or less than the available resources (122). If so, all instructions from both threads are dispatched (124). If not, a check is made as to which thread is the primary thread (126). If thread0 is the primary thread then all instructions from thread0 are dispatched and, if there are any remaining available resources, additional instructions from thread1 are dispatched, while any instructions not dispatched from thread1 will be saved for the next cycle (128). If thread0 is not the primary thread (i.e., thread1 is primary) then the priority is reversed with all instructions from thread1 being dispatched, and additional instructions from thread0 being dispatched as possible, while any instructions not dispatched from thread0 will be saved for the next cycle (130).

The present invention thus significantly improves dispatching bandwidth in an SMT environment by allowing more efficient utilization of existing processor hardware. This improvement comes with only minor additions to the hardware, in the predecode stage at ICache 46, and the added resource logic in dispatch unit 70.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention is particularly adapted for high-end multiprocessor computer systems, it is also usable in single processor systems. It is therefore contemplated that such modifications can be made without departing from the spirit or scope of the present invention as defined in the appended claims.

What is claimed is:

1. A method of handling instructions in a computer processor having multiple hardware resources, comprising:
   receiving at least first and second program instructions;
   associating first and second resource fields respectively with the first and second program instructions, wherein the resource fields indicate which of the hardware resources are required to carry out the respective program instructions;
   calculating resource requirements for merging the first and second program instructions, based on the first and second resource fields;
   determining resource availability for simultaneously executing the first and second program instructions based on the calculated resource requirements;
   forming an instruction group for simultaneous execution which includes at least the first and second instructions by examining the first and second resource fields; and
   inserting a start bit in at least one of the program instructions to define the instruction group.

2. The method of claim 1 wherein:
   said associating includes encoding first and second resource vectors respectively into the first and second resource fields; and
   said calculating includes decoding the first and second resource fields to derive the first and second resource vectors.

3. The method of claim 1 further comprising storing the first and second resource fields in an instruction cache with the respective first and second program instructions.

4. The method of claim 1 wherein the processor operates in a simultaneous multithreading mode, with the first program instruction being part of a first thread, and the second program instruction being part of a second thread.

5. The method of claim 1 further comprising dispatching the first and second program instructions simultaneously to the hardware resources based on the determined resource availability.

6. The method of claim 1 wherein the hardware resources are execution units, including at least a fixed-point unit, a load/store unit, a floating-point unit, and a branch processing unit.

7. The method of claim 1 wherein said determining includes comparing the calculated resource requirements to the multiple hardware resources.

8. A processor comprising:
multiple hardware resources;
a dispatch unit which dispatches program instructions to said hardware resources, said dispatch unit including instruction group formation logic which calculates resource requirements for merging at least two program instructions and determines resource availability for simultaneously executing the merged program instructions based on the calculated resource requirements; and
predecode logic which associates resource fields with respective program instructions to indicate which of said hardware resources are reciuired to carry out the respective program instructions, wherein said instruction group formation logic forms an instruction group for simultaneous execution which includes at least the first and second instructions by examining the first and second resource fields, and said predecode logic inserts a start bit in at least one of the merged program instructions to define the instruction group.

9. The processor of claim 8 wherein:
said predecode logic associates the resource fields by encoding resource vectors into the respective resource fields; and
said instruction group formation logic decodes the resource fields to derive the respective resource vectors.

10. The processor of claim 8 further comprising a cache which stores the program instructions and provides them to said dispatch unit, and stores the resource fields associated with the respective program instructions.

11. The processor of claim 8 wherein the processor operates in a simultaneous multithreading mode, with a first one of the merged program instructions being part of a first thread, and a second one of the merged program instructions being part of a second thread.

12. The processor of claim 8 wherein said dispatch unit dispatches the merged program instructions simultaneously to the hardware resources based on the determined resource availability.

13. The processor of claim 8 wherein the hardware resources are execution units, including at least a fixed-point unit, a load/store unit, a floating-point unit, and a branch processing unit.

14. The processor of claim 8 wherein said instruction group formation logic determines the resource availability by comparing the calculated resource requirements to the multiple hardware resources.

15. A computer system comprising:
a system memory device;
a cache memory connected to said system memory device; and
at least one processor which receives program instructions from said cache memory, said processor having multiple hardware resources and instruction group formation logic which calculates hardware resource requirements for merging at least two program instructions and determines hardware resource availability for simultaneously executing the merged program instructions based on the calculated resource requirements, wherein
said cache memory includes predecode logic which associates resource fields with respective program instructions to indicate which of said hardware resources are required to carry out the respective program instructions,
said instruction group formation logic forms an instruction group for simultaneous execution which includes at least the first and second instructions by examining the first and second resource fields, and
said predecode logic inserts a start bit in at least one of the merged program instructions to define the instruction group.

16. The computer system of claim 15 wherein:
said predecode logic associates the resource fields by encoding resource vectors into the respective resource fields; and
said instruction group formation logic decodes the resource fields to derive the respective resource vectors.

17. The computer system of claim 15 wherein said cache memory further stores the resource fields associated with the respective program instructions.

18. The computer system of claim 15 wherein said processor operates in a simultaneous multithreading mode, with a first one of the merged program instructions being part of a first thread, and a second one of the merged program instructions being part of a second thread.

19. The computer system of claim 15 wherein said processor further has a dispatch unit which dispatches the merged program instructions simultaneously to said hardware resources based on the determined resource availability.

20. The computer system of claim 19 wherein said hardware resources are execution units, including at least a fixed-point unit, a load/store unit, a floating-point unit, and a branch processing unit.

21. The computer system of claim 15 wherein said instruction group formation logic determines the hardware resource availability by comparing the calculated resource requirements to the multiple hardware resources.

* * * * *